US009779381B1

(12) United States Patent
Konanur

(10) Patent No.: US 9,779,381 B1
(45) Date of Patent: Oct. 3, 2017

(54) SYSTEM AND METHOD OF SIMULTANEOUS COMPUTATION OF OPTIMAL ORDER POINT AND OPTIMAL ORDER QUANTITY

(75) Inventor: Chandrashekar Srikantiah Konanur, North Potomac, MD (US)

(73) Assignee: JDA Software Group, Inc., Scottsdale, AZ (US)

( * ) Notice: Subject to any disclaimer, the term of this patent is extended or adjusted under 35 U.S.C. 154(b) by 27 days.

(21) Appl. No.: 13/327,743

(22) Filed: Dec. 15, 2011

(51) Int. Cl.
*G06Q 10/00* (2012.01)
*G06Q 10/08* (2012.01)
*G06Q 20/20* (2012.01)

(52) U.S. Cl.
CPC ......... *G06Q 10/087* (2013.01); *G06Q 20/203* (2013.01)

(58) Field of Classification Search
CPC .... G06Q 10/08; G06Q 10/087; G06Q 20/203; G06Q 30/02
USPC .......................................................... 705/28
See application file for complete search history.

(56) References Cited

U.S. PATENT DOCUMENTS

| | | | | |
|---|---|---|---|---|
| 5,287,267 A * | 2/1994 | Jayaraman | ............. | G06Q 10/06 705/28 |
| 5,712,989 A * | 1/1998 | Johnson et al. | ................ | 705/28 |
| 5,953,707 A * | 9/1999 | Huang | .................. | G06Q 10/06 705/7.25 |
| 5,963,919 A * | 10/1999 | Brinkley | ............. | G06Q 10/087 705/22 |
| 7,403,975 B2 * | 7/2008 | Berkery et al. | ............... | 709/213 |
| 7,496,530 B2 * | 2/2009 | Cheng et al. | .................... | 705/28 |
| 7,539,630 B2 * | 5/2009 | Crampton et al. | ........... | 705/26.1 |
| 7,852,846 B2 * | 12/2010 | Favor et al. | ................... | 370/394 |
| 2002/0188529 A1 * | 12/2002 | Krever | ................ | G06Q 10/087 705/28 |
| 2004/0030428 A1 * | 2/2004 | Crampton et al. | ............ | 700/101 |
| 2004/0153187 A1 * | 8/2004 | Knight | .................. | G06Q 10/06 700/99 |

(Continued)

OTHER PUBLICATIONS

Ben-Daya, M & Raouf, A. (1994). Inventory models involving lead time as a decision variable. The J. of the Oper. Res. Soc. 45(5), p. 579-582.*

(Continued)

*Primary Examiner* — Andrew Joseph Rudy
(74) *Attorney, Agent, or Firm* — Jackson White, PC; Steven J. Laureanti

(57) ABSTRACT

A system is disclosed for simultaneous computation of optimal order point and optimal order quantity. The system includes one or more memory units and on ore more processing units, collectively configured to receive initial inputs, initialize a first, at least second and final locations and the initial inputs and compute a first baseline inventory performance of the first level. The system is further configured to compute at least a second inventory performance of the at least second level and perform optimization iterations by simultaneously determining a change in inventory performance for the first and the at least second level when the re-order point (R) is incremented by a specified R increment value and when the re-order quantity is incremented by a specified Q increment value. The system is further configured to report the reorder point and reorder quantity for the first, the at least second, and the final location.

20 Claims, 6 Drawing Sheets

(56) References Cited

U.S. PATENT DOCUMENTS

| | | | | |
|---|---|---|---|---|
| 2005/0060245 | A1* | 3/2005 | Hoffman | G06Q 10/06 705/28 |
| 2006/0031840 | A1* | 2/2006 | Yigit | G06F 9/5088 718/102 |
| 2006/0085235 | A1* | 4/2006 | Nguyen | G06Q 10/087 705/28 |
| 2006/0235557 | A1* | 10/2006 | Knight | G06Q 10/087 700/103 |
| 2008/0015721 | A1* | 1/2008 | Spearman | G06Q 10/06 700/99 |
| 2009/0043638 | A1* | 2/2009 | Wilking et al. | 705/10 |
| 2010/0205044 | A1* | 8/2010 | Scheer | G06Q 10/087 705/28 |
| 2011/0270646 | A1* | 11/2011 | Prasanna | G06Q 10/0633 705/7.27 |
| 2012/0010919 | A1* | 1/2012 | Aswal | G06Q 10/04 705/7.25 |

OTHER PUBLICATIONS

Replenishment Training (Jan. 3, 2010). JDAlearn. JDA Software.*
Foster, T. (2008). Forecasting, Demand Planning in a Difficult Economy. Global Logistics & Supply Chain Strategies. JDA Software.*
Definition: initialize, Random House Dictionary, 2012.*
Quante, R. & Meyr, H. (2008). Revenue management and demand fulfillment: matching applications, models, and software. Springer-Verlag.*
Rao, B. (2000). Improving retail effectiveness through technology: a survey of analytical tools for physical and online retailers. Tech. in Soc. 22, p. 111-122.*
Hariga, M. & Ben-Daya, M. (1999). Some stochastic inventory models with deterministic variable lead time. Eu J. of Oper. Res. 113, p. 42-51.*
Ouyang, T-Y, et al. (2002). Quality improvement, setup cost and lead-time reductions in lot size reorder point models with an imperfect production process. Comp. & Oper. Res. 29, p. 1701-1717 (hereinafter "NPL1").*

* cited by examiner

SYSTEM AND METHOD OF SIMULTANEOUS COMPUTATION OF OPTIMAL ORDER POINT AND OPTIMAL ORDER QUANTITY

TECHNICAL FIELD OF THE INVENTION

This invention relates generally to computer implementable systems, methods, and mediums for calculating inventory levels, and more particularly to a system and method of simultaneous computation of optimal order point and optimal order quantity.

BACKGROUND OF THE INVENTION

Current methodologies and systems for computer service level targets rely on static or disjointed calculations. For example, prior existing solutions for computing an order quantity use a simple economic order quantity (EOQ) formula. The EOQ formula, however, does not take into account the service level targets. Furthermore, EOQ calculations do not take into account the demand and lead time variability that exist in a supply chain. EOQ calculations are calculated offline and subsequently used as static input to the computation of the reorder point. Systems based upon EOQ calculations do not provide the visibility of a service level driven order quantity. Therefore, previous methods have proven inadequate.

SUMMARY OF THE INVENTION

A system for simultaneous computation of optimal order point and optimal order quantity is disclosed. The system includes one or more memory units and on ore more processing units, collectively configured to receive initial inputs, initialize a first, at least second and final locations and the initial inputs and compute a first baseline inventory performance of the first level. The system is further configured to compute at least a second inventory performance of the at least second level and perform optimization iterations by simultaneously determining a change in inventory performance for the first and the at least second level when the re-order point (R) is incremented by a specified R increment value and when the re-order quantity is incremented by a specified Q increment value. The system is further configured to report the reorder point and reorder quantity for the first, the at least second, and the final location.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE INVENTION

Reference will now be made to the following detailed description of the preferred and alternate embodiments. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Various embodiments of the disclosures presented herein enable companies or users to implement an optimal order point, or the inventory level at which an order should be placed. Companies or users may further be enabled to implement an optimal order quantity, or the size of the order to be placed. Service level targets may be measured at a finished goods level to insure customer demand is met. Meeting these service level targets is largely dependent on the optimal order point and the optimal order quantity. Simultaneous computation of both the optimal order point and optimal order quantity solves most, if not all, aspects of inventory, including the safety stock and the cycle stock.

In an embodiment, the optimal re-order point (R) and/or optimal order quantities (Q) are computed or calculated. The service level, then, is a function of R and Q. Various embodiments presented herein achieve the desired service level by iterative over both R and Q, and measuring the impact of change on the service level in each iteration. In an embodiment, a lower cost solution is selected in each iteration until the desired service level is achieved. Such computations may be done across the entirety of any supply chain, measuring the impact of changing R and Q at all levels/nodes in the supply chain, while measuring the end customer service levels. Organizations, companies, or any other user may, therefore, get an optimal re-order point and order quantity to achieve desired service levels.

Figure 1:
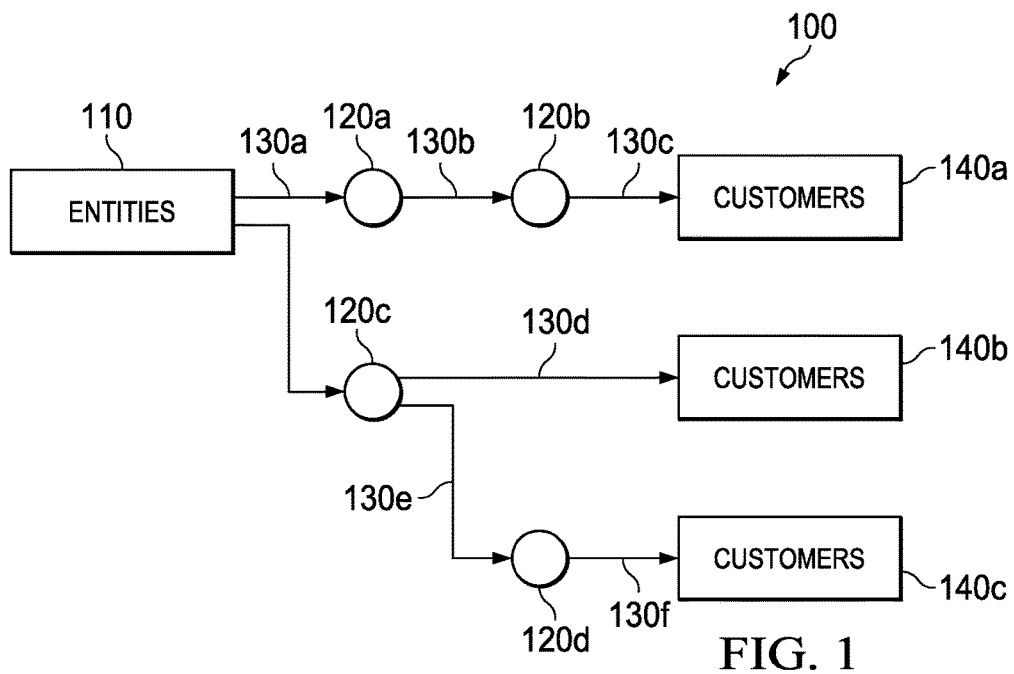
FIG. 1 illustrates an exemplary multi-echelon supply chain according to a preferred embodiment.

FIG. 1 illustrates an exemplary multi-echelon supply chain 100 according to a preferred embodiment. Multi-echelon supply chain 100 receives finished goods from one or more entities 110 and ships the finished goods to one or more customers 140a-c. According to one embodiment, multi-echelon supply chain 100 may include any suitable number of nodes 120a-d and any suitable number of arcs 130a-f configured in any suitable manner. Downstream refers to the direction from entities 110 to customers 140a-c, and upstream refers to the direction from customers 140a-c to entities 110. In the illustrated example, entities 110 supplies finished goods to node 120a and also node 120c. Node 120a supplies finished goods to node 120b, which provides finished goods to customer 140a. Node 120c supplies finished goods to node 120d, which provides finished goods to customer 140c and also provides finished goods to customer 140b.

Multi-echelon supply chain 100 may include any suitable number of nodes 120a-d and any suitable number of arcs 130a-f configured in any suitable manner. Downstream refers to the direction from entities 110 to customers 140a-c, and upstream refers to the direction from customers 140a-c to entities 110. In the illustrated example, entities 110 supplies finished goods to node 120a and also node 120c. Node 120a supplies finished goods to node 120b, which provides finished goods to customer 140a. Node 120c supplies finished goods to node 120d, which provides finished goods to customer 140c and also provides finished goods to customer 140b.

Multi-echelon supply chain 100 includes one or more starting nodes 120a and 120c upstream from one or more ending nodes 120b and 120d. Each starting node, in this example node 120a and 120c, receives finished goods directly from one or more entities 110, possibly in addition to finished goods from one or more upstream nodes that each receive finished goods directly or indirectly from one or more entities 110. Each ending node, in this example nodes 120b and 120d, supplies finished goods directly to one or more customers 140a-c, possibly in addition to finished goods supplied to one or more downstream nodes that each supply finished goods directly or indirectly to one or more customers 140a-c. A starting node and an ending node may define a path that includes a starting node, an ending node, and any intermediate nodes between the starting node and the ending node.

One or more entities 110 may refer to, for example, a manufacturing plant at the top level of multi-echelon supply chain 100 where the finished goods are produced. Finished goods flow through multi-echelon supply chain 100 and may comprise, for example, parts, supplies, or services that may be used to generate products or may comprise the products themselves. Finished goods are shipped to nodes, which may be, for example, warehouses where the finished goods may be stored and shipped to other nodes, which may be, for example, regional distribution centers where the finished goods may be stored before being shipped to customers.

Although multi-echelon supply chain 100 is illustrated as having a particular number of entities 110, customers 140a-c, nodes 120a-d, and arcs 130a-f, any suitable modifications, additions, or omissions may be made to multi-echelon supply chain 100 without departing from the scope of the invention. For example, multi-echelon supply chain 100 may have more or fewer nodes or arcs. As another example, node 120a may supply finished goods to node 120d rather than to node 120b. As another example, node 120a may supply finished goods directly to a customer 140a.

Figure 2:
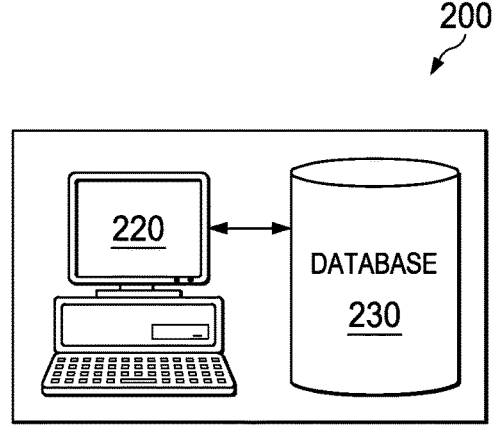
FIG. 2 is a block diagram illustrating an exemplary system in accordance with an embodiment.

FIG. 2 is a block diagram illustrating an example system 200 in accordance with a preferred embodiment. System 200 comprises a computer 220 and a database 230. System 200 may be coupled with one or more supply chain entities of a supply chain network using one or more local area networks (LANs), metropolitan area networks (MANs), wide area networks (WANs), such as, for example, the Internet, or any other appropriate wire line, wireless, or other links. Although a single computer 220 and a single database 230, are shown and described; embodiments contemplate any number of computers and/or any number of databases, according to particular needs. In addition, or as an alternative, system 200 may be integral to or separate from the hardware and/or software of any one of the one or more supply chains entities.

In one embodiment, computer 220 includes any suitable input device, such as a keypad, mouse, touch screen, microphone, or other device to input information. An output device conveys information associated with the operation of system 200, including digital or analog data, visual information, or audio information. Computer 220 includes fixed or removable computer-readable storage media, such as, for example, magnetic computer disks, CD-ROM, or other suitable media to receive output from and provide input to system 200. Computer 220 includes one or more processors and associated memory to execute instructions and manipulate information according to the operation of system 200.

Although a single computer 220 is shown in FIG. 2, system 200 may operate on separate computers 220 or may operate on one or more shared computers 220. Each of these one or more computers 220 may be a work station, personal computer (PC), network computer, notebook computer, personal digital assistant (PDA), cell phone, telephone, wireless data port, or any other suitable computing device.

In one embodiment, the memory associated with one or more computers 220 comprises any of a variety of data structures, arrangements, and/or compilations configured to store and facilitate retrieval of information. The memory may, for example, comprise one or more volatile or non-volatile memory devices. Although the memory is described as residing within one or more computers 220, the memory may reside in any location or locations that are accessible by one or more computers 220 or the one or more processors. The memory may store and the one or more processors may process any suitable information to perform operations in, for example, system 200.

Database 230 comprises one or more databases or other data storage arrangements at one or more locations, local to, or remote from, computer 220. Database 230 may be coupled with computer 220 using one or more local area networks (LANs), metropolitan area networks (MANs), wide area networks (WANs), such as, for example, the Internet, or any other appropriate wire line, wireless, or other links. Database 230 stores data that may be used by computer 220.

A particular embodiment may comprise a multi-echelon supply chain for finished goods. Other embodiments may comprise any number of levels for products and any stage of production, including but not limited to raw materials, supplies, partially manufactured goods, or finished goods. In an embodiment, a supply chain may consist of a plant, at the top level of the supply chain, where the finished good is produced. The product may then be shipped to any number of warehouse at the next level down in the supply chain. From the warehouse, the product may be shipped to any number of regional distribution centers, followed by shipment to any number of customers.

Customer demand is typically experienced at the end echelon, location, or lowest level. On occasion, however, a warehouse or other middle echelon location may ship directly to customers. Customer demand, therefore, may also be experienced at those or any other location. Regional distribution centers or various other locations need to have an optimal performance of customer service. In an embodiment, customer service may be defined as high fill rate or lower customer wait time. In other embodiments, customer service may comprise any value or characteristic that aids in serving a customer. Furthermore, finished goods inventory may be held at all levels. An objective of an embodiment of the model may be to find optimal inventory parameters re-order point and re-order quantity in a supply chain so that the customer service provided by the supply chain is optimal.

Customer service performance may be measured against customer orders, or the demand of a product. However, since the mode is required to compute the expected optimal customer performance, the model is computed using the forecast demand. Forecast demand is the anticipated or projected customer demand. In a model, an average demand that represents a long term forecast demand may be utilized. In other models, any demand value representing any period of time or other variety of characteristic. In various embodiments, the demand or forecast demand may be inputted by a user into the model. Because, however, the demand may comprise a forecast demand, errors may occur in the forecast. The forecast error is typically represented using a mean square error (MSE) of the forecast, and may be computed by comparing the historical forecast and actual customer orders. The forecast error may be taken as a user input to the model, rather than being computed by the model. In an embodiment, the user may provide the forecast error at all echelons of the model.

Lead-time at the producing location, plant, or any other location may comprise the production lead-time in various embodiments. If the finished good is not produced, but is rather procured from a supplier or a vendor, then the lead-time may be the procurement lead-time. At other level echelons, such as but not limited to warehouses and/or distribution centers, the lead-time may comprise the transportation lead-time from the source location. In an embodiment of a model, the lead-time may be assumed to be an average observed lead-time.

The lead-time may further be assumed to be varying for each procurement. Such a variability in lead-time may impact performance of the supply chain. Variability of the lead-time may be expressed in an embodiment of a model as the mean square error (MSE) of the lead-time. MSE of the lead-time may be computed by comparing the historical production and shipment plan versus the actual performances. The lead-time error may, in some embodiments, be taken as a user input to the model rather than be computed by the model. Accordingly, the user may provide the lead-time error at all echelons of the model.

Figure 7:
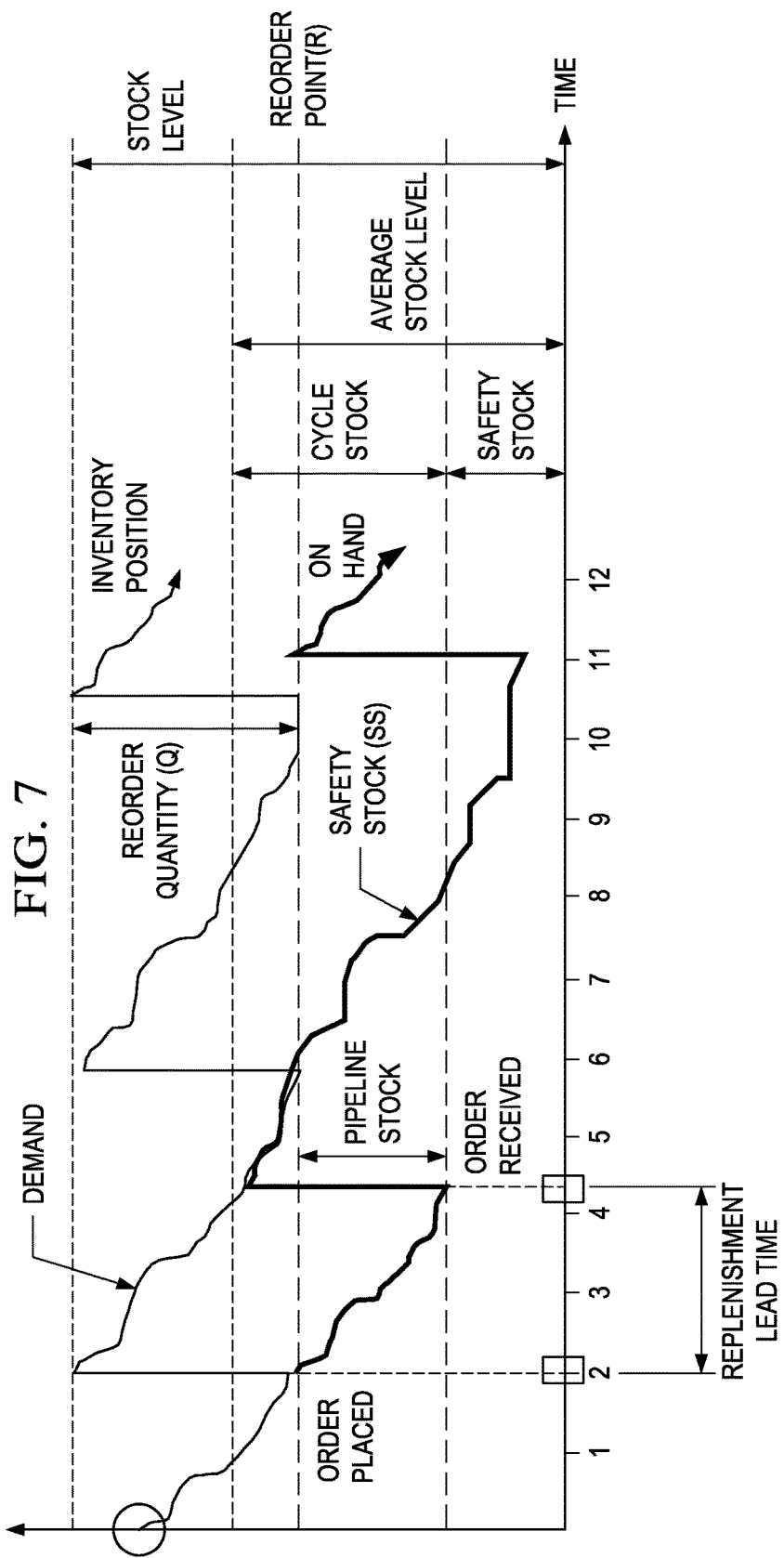
FIG. 7 is a graph illustrating inventory position.

For example, as shown in FIG. 7, inventory position is defined as on-hand+on-order inventory of any item-location. Demand may continuously consume the inventory position over periods of time as shown. Re-order point (R) may be defined as a level at which replenishment order of the quantity of re-order quantity (Q) is placed. When the replenishment order is placed, the on-order quantity may be increased, and hence the inventory position may raise to a maximum level of R+Q, as shown in FIG. 7.

In an embodiment, an objective is to compute the optimal re-order point (R) and the re-order quantity (Q) so that the system can provide the desired service level in meeting customer demands. Various equations and symbols may be utilized in determining the R and Q. A summary of the symbols and explanations of the symbols may be found in Table 1.

TABLE 1

| Symbol | Explanation |
| --- | --- |
| D | The random variable representing the demand |
| $\mu_D$ | Average demand |
| $\sigma_D^2$ | Variance of demand |
| L | The random variable representing the procurement lead time |
| $\mu_L$ | Expected Procurement lead time $\mu_L$ = E[L] |
| $\sigma_L^2$ | Variance of procurement lead time $\sigma_L^2$ = Var[L] |
| PPV | The random variable representing the procurement problem variable |
| $\mu_{PPV}$ | Mean of the Procurement Problem Variable $\mu_{PPV}$ = E[PPV] |
| $\sigma_{PPV}^2$ | Variance of procurement problem variable $\sigma_{PPV}^2$ = Var[PPV] |
| UC | Unit Cost |
| HC | Holding Cost |
| OC | Ordering Cost |

In an embodiment, the mean of PPV may be defined as $\mu_{PPV} = \mu_D \mu_L$

The variance of PPV may be defined as $\sigma_{PPV}^2 = \mu_L \sigma_D^2 + \mu_D^2 \sigma_L^2$ For a given stock level of an item-location, defined as a scenario "i", there are different scenarios. In a first scenario, the item may be at the produced or procured location. For a consumable item at the highest level location, only one replenishment scenario may exist: any items needed must be produced or procured, and the distribution of the procurement time does not change. The performance formulas may be used directly as shown in Table 2.

TABLE 2

| Scenario | $P_s$ | L | $\sigma_L^2$ |
| --- | --- | --- | --- |
| 1 | 1 | $L_{i0}$ | $\sigma_{Li0}^2$ |

In a second scenario, the item may be at a destination location. In a multi-echelon network, a lower level location (destination) in the supply chain may experience various impacts. The lead-time may equal the average lead-time to the source and expected customer wait-time at the source. The lead-time variance may equal the lead-time variance on the network plus the variance of customer wait time at the source. For an item at a destination location, the distribution of the procurement lead times may vary depending on whether or not there is stock available at the source level. At least two replenishment scenarios may exist: first, the source location has the item in stock, or second, the source location does not have the item in stock. Parameters describing these scenarios may include those shown in Table 3.

TABLE 3

| Scenario | In stock at depot | $P_s$ | L | $\sigma_L^2$ |
| --- | --- | --- | --- | --- |
| 1 | Yes | $FR_{i0}$ | $t_{ship}$ | 0 |
| 2 | No | $1 - FR_{i0}$ | $t_{ship}$ + E[CondWT$_{i0}$] | Var[CondWT$_{i0}$] |

For any item-location for each scenario "1" and for any given R and Q, the following inventory performances may be computed using the following equations:

Fill rate=a function of first order loss function of the R and R+Q

Compute:

$$FR_i = 1 - \frac{G_i^1(r) - G_i^1(r+Q)}{Q}$$

Expected back order=a function of second order loss function of the R and R+Q

Compute:

$$E(B_i) = \frac{G_i^2(r) - G_i^2(r+Q)}{Q}$$

Variance of back order=a function of back order level and second order loss function of the R and R+Q:

$$\text{Var}(B_i) = \frac{2}{Q}\left(\sum_{k=1}^{Q} G_i^2(r+k)\right) + E(B_i) - E(B_i)^2$$

In the above equations, $G_i^1(x)$ and $G_i^2(x)$ for the scenario "i" may be the first and second order loss functions, given an argument x. The logic to compute different loss functions may be based on the value of $\mu_{PPV}$ and $\sigma_{PPV}^2$ of the scenario.

The overall fill rate for this and other item-location for the current value of R and Q may be computed as:

$$FR = \sum_{i=1}^{N} p_i FR_i.$$

The overall expectation of backorders E(B) for this item-location for the current value of R and Q may be computed as:

$$E[B] = \sum_{i=1}^{N} p_i E(B_i).$$

The overall variance of backorders Var(B) for this item-location for the current value of R and Q may be computed as:

$$\text{Var}[B] = \sum_{i=1}^{N} p_i \text{Var}(B_i) + E(B_i)^2 - \left(\sum_{i=1}^{N} p_i E(B_i)\right)^2$$

The expected customer wait time may equal a function of expected back order and average demand, expressed as:

$$E[CWT] = \frac{E[B]}{\mu_D}$$

The variance of customer wait time may equal a function of variance of back order, expected backorder, average demand, and demand variance, expressed as:

$$\text{Var}[CWT] = \frac{\text{Var}[B] - \frac{\sigma_D^2}{\mu_D} E[B]}{\mu_D^2}$$

The overall expectation and variance of conditional wait-times for the item-location for the current level of R and Q may be computed as $$E[CondWT] = \frac{E[CWT]}{1 - FR}$$

and $$\text{Var}[CondWT] = \frac{\text{Var}[CWT] - (1 - FR)(E[CondWT] - E[CWT])^2 - FR(E[CWT]^2)}{(1 - FR)}$$

Performance of the optimization may include various goals. For example, the inventory performance of an item-location may be a function of R and R+Q. This inventory performance of any item location may have an impact of the inventory performance of a down-stream location. The impact or effect on the down-stream location may be due to the effect of customer wait-time at the source location. Using this property of inter-relation of R and Q of each level location, the optimal R and optimal Q may be computed through iterations of R and Q.

To find the optimality, the performance derivative of the cost may be utilized. The cost utilized here may comprise total cost, including but not limited to total cost. In an embodiment, the cost utilized is demand unit cost plus average inventory holding cost plus ordering cost, where average inventory is a function of Q, R, and an expected backorder. This may be expressed as:

$$AverageInventory = \frac{Q+1}{2} + R - \mu_{PPV} + E[B].$$

Annual Inventory Cost=$D*365*UC$+Average Inventory$*HC+OC*((D*365)/Q)$

The average inventory cost may equal the average inventory multiplied by the holding cost (rate). In an embodiment, an objective function of the optimization may be defined as the increase in inventory performance of increasing the R or Q, for least increase in cost.

Various embodiments may require the user to provide and/or input information. In an embodiment, the user may provide a multi-echelon supply structure. The multi-echelon supply chain structure may comprise any variety of item-locations and source relations to the item-locations.

In an embodiment, the user may provide a lead-time distribution. For the highest level item-locations, average lead-time may comprise the average production of procurement lead time. The variance of lead-time may comprise the variance in production or procurement lead time. For destination locations, the average lead time is the transportation lead time between locations, and the variance of transportation lead time between locations.

In an embodiment, the user may provide demand distributions for each item-location. This may comprise a mean daily demand for each item-location and/or a demand variance for each item-location.

In an embodiment, the user may provide a target performance. The target performance may comprise at least one of either a fill rate or customer wait time at the end locations. The end locations, for example, may comprise a customer facing location where the demand may be filled.

In an embodiment, the user may provide heuristic parameters. The heuristic parameters may comprise a parameter that increments to iterate the re-order point and increments to iterate the re-order quantity. In some embodiments, these parameters may not be provided or included. If not provided, each parameter may be assumed to equal 1.

The optimization may then be initialized at all item-locations with the supply chain structure and any of the user provided initial values.

Figure 3:
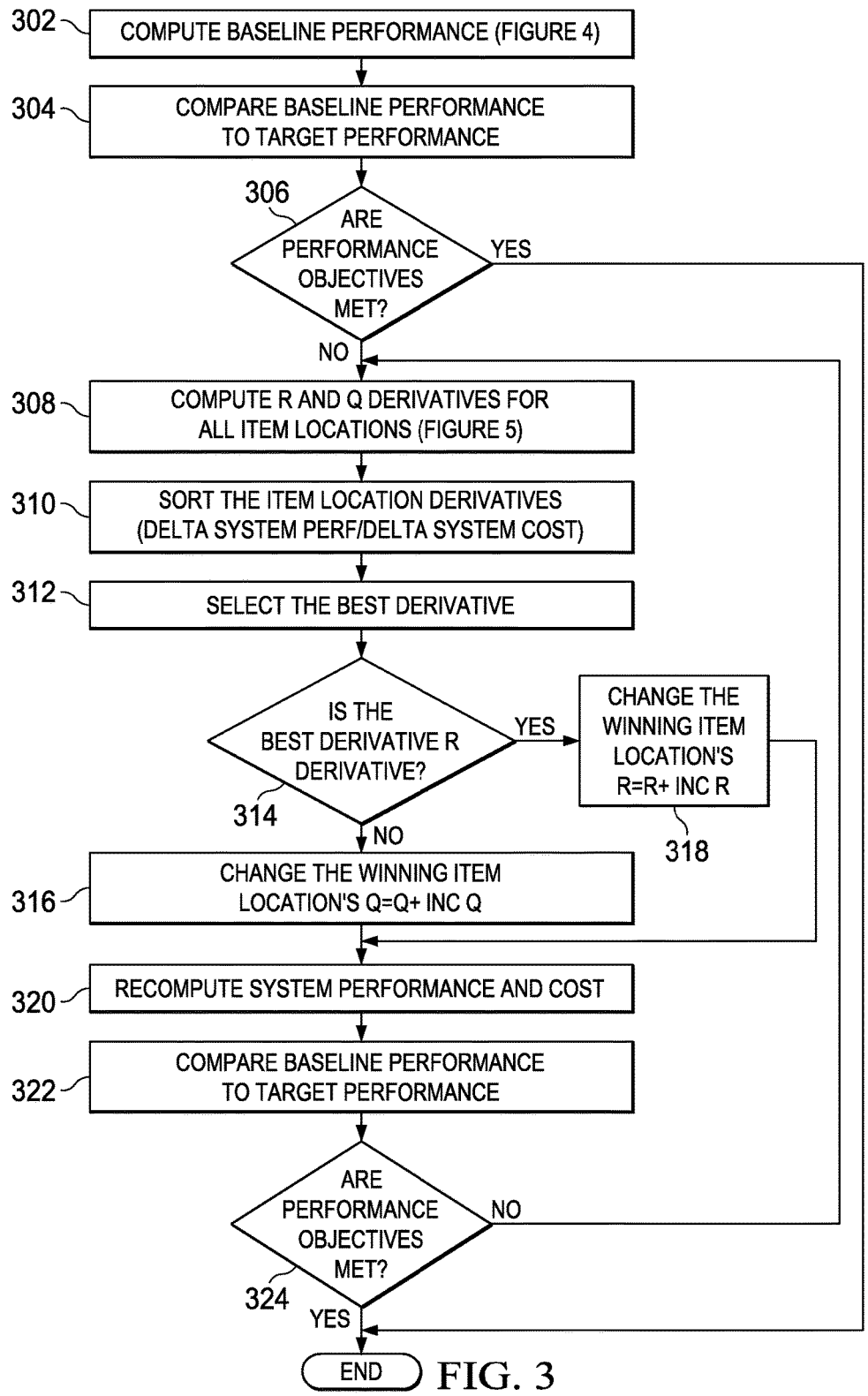
FIG. 3 is a flowchart illustrating an embodiment of an optimization inventory performance computation.

FIG. 3 illustrates optimization steps of an embodiment. The optimization may begin by computing a baseline performance 302 (shown in greater detail in FIG. 4). The baseline performance may then be compared to a target performance 304. A determination may then be made as to whether performance objectives have been met 306. If performance objectives have been met, then the optimization may end. If performance objectives have not been met, the optimization may then proceed to compute R and Q for all item-locations 308 (shown in greater detail in FIG. 4). Item-location derivatives may then be sorted 310. Item-location derivatives may be associated with delta system perf/delta system cost. From this, a best or preferred derivative may be selected 312.

An embodiment of the optimization may continue by determining whether the best derivative is the R derivative 314. If the best derivative is the R derivative, then the winning item-location's R may be changed to equal R plus Inc R 318. If the best derivative is the Q derivative, the winning item-location's Q may be changed to equal Q plus Inc Q 316. The system performance and cost may then be recomputed 320. A comparison of the baseline performance to the target performance 322 may then occur. A determination of whether performance objectives have been met 324 may be made. If the performance objectives are met, then the optimization may end. If the performance objectives have not been met, the optimization may then return to compute R and Q derivatives for all item-locations 308, and proceed as previously described.

Figure 4:
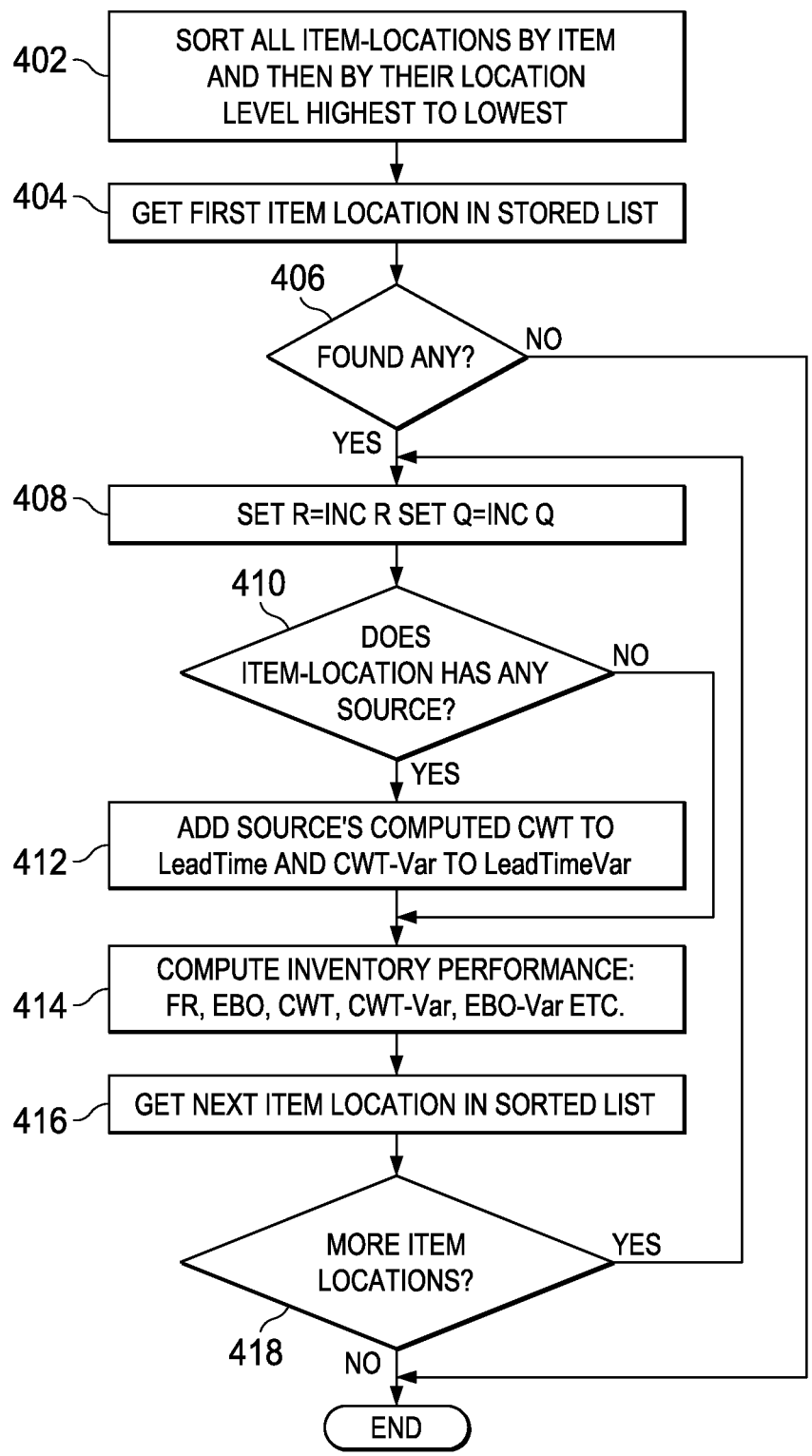
FIG. 4 is a flowchart illustrating an embodiment of a base-line inventory performance computation.

FIG. 4 illustrates a flowchart of an exemplary base-line inventory performance computation of an embodiment. For each item, the highest level locations in the supply chain may comprise the start of the computation. The initial re-order point may be set as a user-provided increment of re-order point R, while the initial re-order quantity may be set as a user-provided increment of reorder quantity.

All the inventory performances for this R and R+Q may then be computed using the previously noted math equations. This may include the computation of customer wait-time and customer wait-time variance at a particular level in a supply chain. This computed customer wait-time and customer wait-time variance may be used in the destination location scenarios, as described in the inventory performance math equations.

The second highest level item-location inventory performance may then be computed in an embodiment. The computation of base-line performances computation of all lower level item-locations may be repeated. This computation may use the higher level item-location customer wait time, customer wait time, and custom wait time variances computed.

In an embodiment, the base-line inventory performance computation may begin by sorting of all item-locations by item and then by their location level 402. Sorting by location may comprise sorting from the highest level to the lowest level. The base-line inventory performance computation may continue by getting or retrieving the first item-location in the sorted list 404. A determination may then be made if any item locations have been found 406. If none have been found the base-line performance computation may end. If any have been found, the base-line inventory performance computation may then set R to equal Inc R and set Q to equal Inc Q 408. The base-line inventory performance computation may then determine whether the item-location has any source 410. If the item-location has a source, then the source's computed CWT may be added to the lead-time, and CWT-variance added to the lead-time variance 412. The inventory performance FR, EBO, CWT, CWT-variance, EBO-variance, amongst other things, may then be computed 414.

If the item location does not have any source, then the base-line inventory performance computation does not add the source's computed CWT to the lead-time and the CWT-variance to the lead-time variance. Instead, the base-line inventory performance computation may jump directly to computing inventory performances FR, EBO, CWT, CWT-variance, EBO-variance, and the like 414.

The next item-location in the sorted list may then be retrieved, viewed, or prepared for analysis 416. A determination may then be made whether there are more item-locations 418. If there are more item-locations, then the base-line inventory performance computation may return to set R equal to Inc R and Q equal to Inc Q 408. If there are no more item-location, then the base-line inventory performance computation may end.

Various embodiments may run at least one optimization iteration. Optimization iterations involve computing an impact of inventory performance for all related SKUs (or all levels of destinations) by two questions: 1. What if the re-order point (R) is incremented by the user-specified increment value; and 2. What if the re-order quantity (Q) is incremented by the user-specified increment value.

Figure 5:
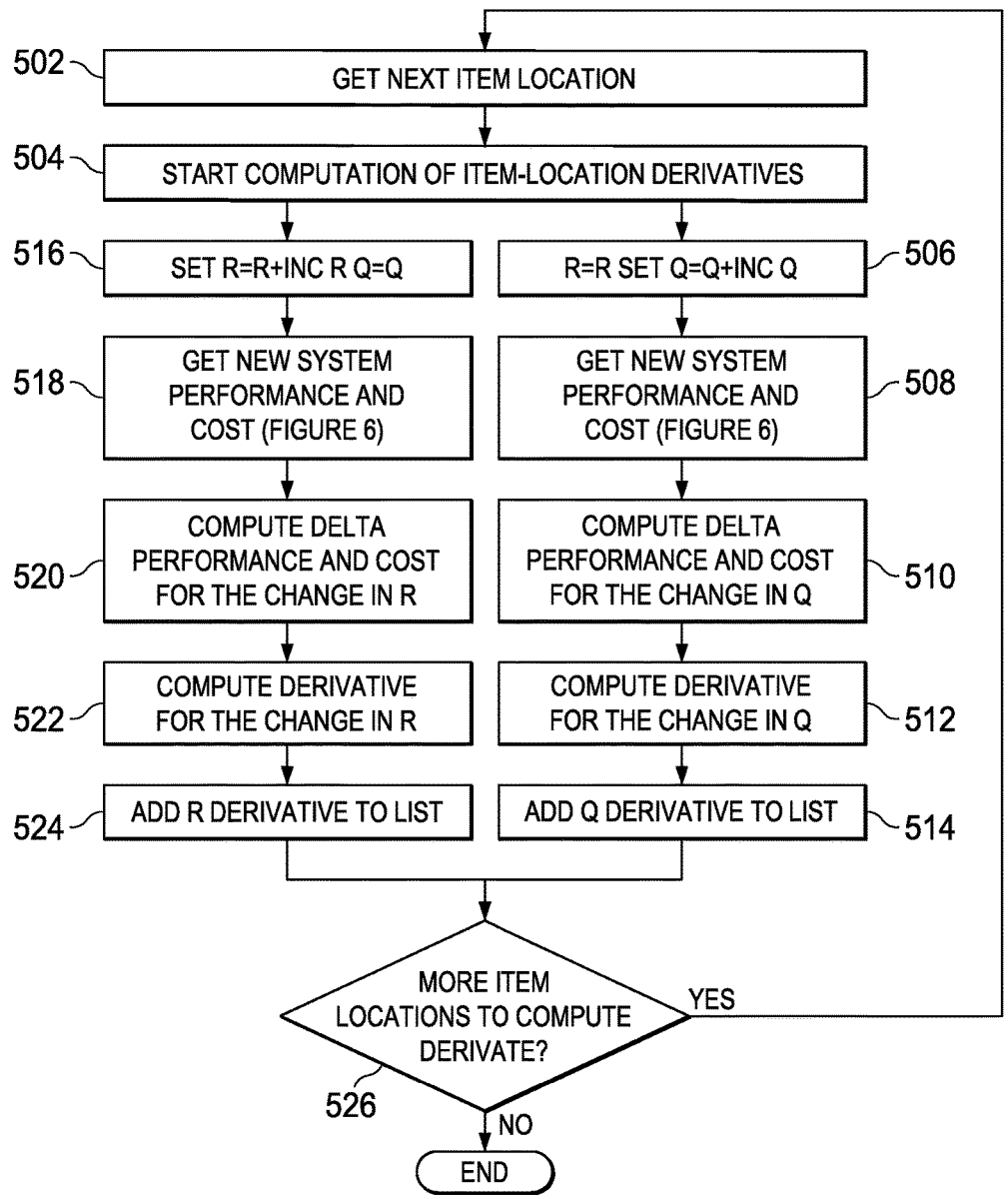
FIG. 5 is a flowchart illustrating an exemplary method of computing R and Q system performance derivatives.

FIG. 5 illustrates an exemplary flowchart for computing R and Q system performance derivatives. In an embodiment, computing R and Q system performance derivatives may comprise getting or retrieving a next item-location 502 and starting computation of item-location derivatives 504. Computing R and Q system performance derivatives may then split into two paths. First, R equals R and Q is set to equal Q+Inc Q 506. A new system performance and cost may then be retrieved or prepared 508 (as shown in greater detail in FIG. 6). Delta performance and cost for the change in Q may then be computed 510, followed by the derivative for the change in Q 512. The Q derivative may then be added to the list 514.

A second path may comprise setting R equal to R plus Inc R, where Q equals Q 516. A new system performance and cost may then be retrieved or prepared 518 (as shown in greater detail in FIG. 6). Delta performance and cost for the change in R may then be computed 520, followed by the derivative for the change in R 522. The Q derivative may then be added to the list 524. After both the R derivative 524 and the Q derivative 514 are added to the list, a determination may be made whether more item-locations are necessary or present to compute or derivate 526. If yes, then the computing R and Q system performance derivative returns to get the next item-location 502. If there are no more locations to compute or derivate, then the computation may end.

In an embodiment, each item-location increment of each variable R and Q may provide a set of results, including target performance and/or average inventory of all the related item-locations. The system inventory performance may be computed as an independent demand weighted sum of performance of all item-locations for each hypothesis or question for each iteration. System inventory cost may be computed as a sum of the total annual cost of all item-locations, for each hypothesis or question for each location.

Figure 6:
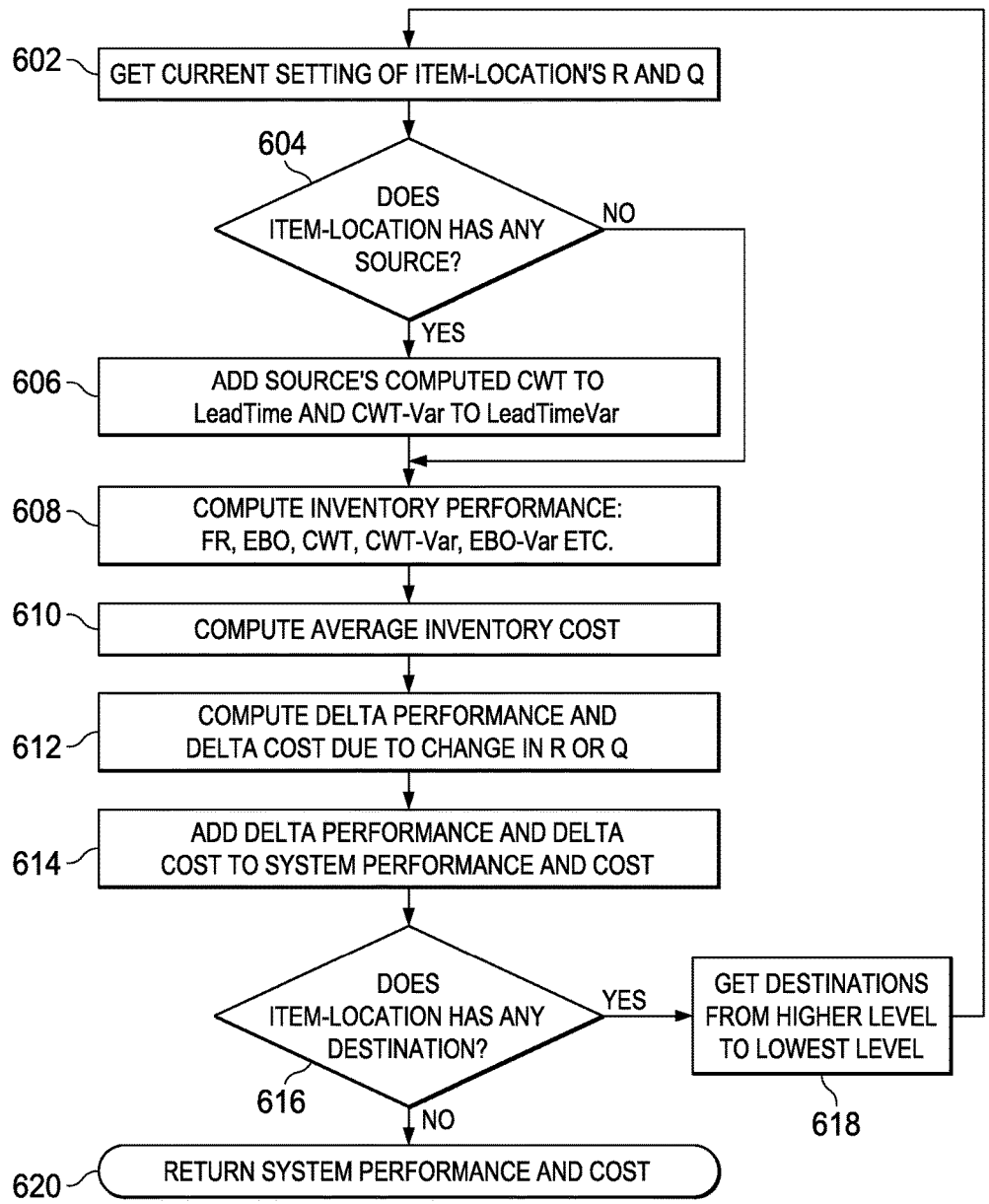
FIG. 6 is a flowchart illustrating an exemplary method of computing new system performance and cost.

FIG. 6 illustrates an exemplary flowchart for computing a new system performance and cost. In an embodiment, computing a new system performance and cost may comprise getting or otherwise retrieving a current setting of item-location's R and Q 602. A determination may then be made whether the item location has any source 604. If the item-location has a source, then the source's computed CWT may be added to the lead-time, and the CWT-variance may be added to the lead-time variance 606, before the inventory performance FR, EBO, CWT, CWT-variance, and EBO variance are computed 608. If the item-location does not have a source, the inventory performance FR, EBO, CWT, CWT-variance, and EBO variance are computed without additions described in relation to 606.

Total annual cost may also be computed 610 in various embodiments. Computation of delta performance and delta cost due to change in R and/or Q 612 may then be performed. Delta performance and delta cost may then be added to system performance and system cost 614. A determination may then be made whether the item-location has any destination 616. If no, then a return to system performance and cost 620 may occur. If it does, then destination from the higher level to the lower level may then be retrieved 618.

In an embodiment, the system performance derivative may be computed as a system inventory performance/system inventory cost. Such a system performance derivative computed for increment R for each item-location and increment Q for each item-location may be compared. The best system for performance derivative and, hence, the item location and one of its hypothesis or questions (increment R or increment Q is selected a winner hypothesis.

The inventory performance of all related destination item-locations pertaining to the winning item-location may be computed after incrementing either R or Q. All other item-location iterations of R and/or Q will be reset, as they may typically comprise merely hypothetical increments that do not win. In an embodiment, the above reference set of iterations are repeated until all end-echelon item locations achieve the target performance specified by the user, such as but not limited to the fill rate or customer wait time.

In various embodiments, the optimization may comprise optimization constraint iterations. For example, a user may specify performance constraints on some item-locations to achieve certain minimum performance levels of fill rate or customer wait time. This constraint may be specified on any item-location. In such situations, only the item-locations that have the performance constraints and their destination locations may be considered for optimization constraints iterations. The same hypothesis of incrementing R and/or Q will be performed until all the item-location performance constraints are achieved.

Various embodiments of the optimization may further comprise cost reduction repair iterations. For example, when the performance constraints are specified by the user, the iterations of incrementing the R and/or Q may be performed to meet those constraints over and above iterations required to meet the end-echelon target performance. This may result in over-achieving the end-echelon target performance. Over-achieving the end echelon target may result in higher inventory cost in the system as either R or Q at some item-locations may have reached over the true optimal levels due to constraints.

To over come this, some item-location R and/or Q may be reduced without affecting the performance constraints specified and/or end echelon locations target performance. In such situations, only the end echelon item-locations that have over-achieved the target performance and their source locations may be considered for repair optimization constraints iterations. In these iterations, a hypothesis of decrementing R and/or Q may be performed. For each hypothesis iteration of R or Q, the derivate compared with the least reduction in "system performance derivative" may be selected, which means the item-location that results in least reduction in "system performance" for the highest reduction in "system inventory cost".

If any item-location reduction of R and/or Q results in violation of performance constraints or the end-echelon item-location target performance, such item-location may be removed from the next set of repair iterations.

Various embodiments of optimization may include a variety of final results. In an embodiment, the final results of the optimization may be for each item-location and may include: re-order point R computed in the optimization; re-order Quantity Q computed in the optimization; expected fill rate as computed in the final iteration; expected customer wait time as computed in the final iteration; safety stock $ss=R-\mu_{PPV}$; expected back order as computed in the final iteration; average inventory as computed in the final iteration; stock level $S=R+Q$; average inventory cost that equals average inventory multiplied by the inventory holding cost; cycle stock equal to the average inventory−safety stock.

Various embodiments may also include a method of selection of a different distribution function in the computation of first order and second order loss functions based on the value of $\mu_{PPV}$ and $\sigma_{PPV}^2$. For example, if $$\mu_i \leq 50 \text{ and } \sigma_i^2 \leq \mu_i$$

In this case the distribution of PPV is assumed to be poisson. So we use of the appropriate line loss functions of a poisson distribution with mean $\mu_i$//

$$g_i(x) = \frac{\mu_i^x e^{-\mu_i}}{x!}$$

$$G_i^0(x) = 1 - \sum_{y=0}^{x} g_i(y)$$

$$G_i^1(x) = -(x - \mu_i)G_i^0(x) + \mu_i g_i(x)$$

$$G_i^2(x) = \left(\frac{1}{2}\right)\{[(x - \mu_i)^2 + x]G_i^0(x) - \mu(x - \mu_i)g_i(x)\}$$

Else If $\mu_i \leq 50$ and $\sigma_i^2 > \mu_i$

In this case the distribution of PPV is assumed to be negative binomial. Use of the appropriate line loss functions of a negative binomial distribution with mean $\mu_i$ and variance $\sigma_i^2$// may occur.

//First calculate the various parameters for the negative binomial distribution, p and n//

$$\text{Calculate } p_i = 1 - \frac{\mu_i}{\sigma_i^2}$$

$$\text{Calculate } n_i = \mu_i \times \left(\frac{1 - p_i}{p_i}\right)$$

$$\text{Calculate } \beta_i = \frac{p_i}{1 - p_i}$$

$$g_i(x) = \frac{\Gamma(n_i + x)}{\Gamma(n_i)\Gamma(x+1)} p_i^x (1 - p_i)^n$$

$$G_i^0(x) = 1 - \sum_{y=0}^{x} g_i(y)$$

$$G_i^1(x) = -(x - n_i\beta_i)G_i^0(x) + (x + n_i)\beta_i g_i(x)$$

$$G_i^2(x) = \left(\frac{1}{2}\right)\{[n_i(n_i + 1)\beta_i^2 - 2n_i\beta_i x + x(x+1)]$$
$$G_i^0(x) + [(n_i + 1)\beta_i - x](x + n_i)\beta_i g_i(x)\}$$

Else if $\mu_i > 50$

In this case the PPV is normally distributed; so we use the first order and second order line loss functions of a normal distribution//

//First transform to the unit normal variate z//

$$z_i = \frac{x - \mu_i}{\sigma_i}$$

//Next calculate the pdf and 1−cdf respectively//

$$\phi(z_i) = \frac{1}{\sqrt{2\pi}} e^{-z_i^2/2}$$

$$\Phi^0(z_i) = \int_{z_i}^{\infty} \phi(z_i) dz$$

//Now calculate the first order loss and second order loss//

$$G_i^1(x) = \sigma[-z_i \Phi^0(z_i) + \phi(z_i)]$$

$$G_i^2(x) = \sigma^2 \lfloor (z_i^2 + 1)\Phi^0(z_i) - z_i \phi(z_i) \rfloor$$

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a multi-echelon supply chain network comprising two or more entities, the two or more entities comprising at least a first entity that produces an item and at least a final entity comprising a customer demand;
one or more computers comprising one or more memory units and one or more processing units, collectively configured to:
receive initial inputs over a computer network, the initial inputs comprising a target performance of the multi-echelon supply chain network and the two or more entities, each of the two or more entities comprising a reorder point (R) and an ordering quantity (Q);
compute a baseline inventory performance;
compare the baseline inventory performance to the target performance;
compute a reorder point derivative and an ordering quantity derivative for each of the two or more entities;
sort the one or more reorder point and ordering quantity derivatives;
select a best derivative (D') based on maximizing improvement in inventory performance while minimizing increase in cost;
constantly monitor the D' to determine whether the D' is the reorder point derivative or the ordering quantity derivative;
automatically change the reorder point (R) of the entity corresponding to the best derivative to the R plus a reorder point increment (Inc R) when the D' is the reorder point derivative;
automatically change the ordering quantity (Q) of the entity corresponding to the best derivative to the Q plus an ordering quantity increment (Inc Q) when the D' is the ordering quantity derivative;
compute a new inventory performance; and
compare the new inventory performance to the target performance; and
at least one of the two or more entities, adjusts the ordering quantity (Q) at least partially based on the new inventory performance such that the size of the order is based on the adjusted ordering quantity (Q) of the item when the reorder point (R) is reached to reduce a customer wait time for the item based on the target performance associated with the final entity in the multi-echelon supply chain network.

2. The system of claim 1, wherein the initial inputs further comprise:
a reorder point increment and an ordering quantity increment (Q');
an average lead-time for each of the two or more entities in the multi-echelon supply chain network;
a lead-time variance for each of the two or more entities in the multi-echelon supply chain network;
a mean daily demand of each of the two or more entities in the multi-echelon supply chain network;
a demand variance of each of the two or more entities in the multi-echelon supply chain network;
a unit cost for each of the two or more entities in the multi-echelon supply chain network;
a holding cost for each of the two or more entities in the multi-echelon supply chain network; and
an ordering cost for each of the two or more entities in the multi-echelon supply chain network.

3. The system of claim 2, wherein the target performance further comprises a fill rate.

4. The system of claim 3, wherein:
the initial inputs further comprise at least one performance constraint; and
the one or more computers are further configured to:
automatically perform at least one optimization constraint iteration based on the at least one performance constraint for at least one of the two or more entities in the multi-echelon supply chain network such that the at least one entity is considered for the optimization constraint iteration when the at least one performance constraint is satisfied.

5. The system of claim 4, wherein the one or more computers are further configured to:
perform at least one cost reduction repair iteration by reducing at least one of either the R or the Q associated with at least one entity in the multi-echelon supply chain network; and
automatically perform the cost reduction repair iterations by simultaneously determining a change in inventory performance for levels in the multi-echelon supply chain network when the R is decremented by the R' and when the Q is decremented by the Q'.

6. The system of claim 5, wherein the final entity comprises one or more source entities, and the at least one cost reduction repair iteration automatically considers only the final entity and the one or more source entities of the final entity when the final entity has over-achieved the target performance and the at least one source entity is considered for the cost reduction repair iteration.

7. The system of claim 6, wherein the one or more computers are further configured to report:
an expected fill rate of the final entity;
an expected customer wait time at the final entity;
an average inventory as a function of the Q, safety stock, and expected back order;
the safety stock;
a stock level;
the average inventory cost; and
a cycle stock.

8. The system of claim 2, wherein:
each entity further comprises an item and a level location; and
compute the baseline inventory performance further comprises:
create a sorted list by sorting each of the one or more of the entities in the multi-echelon supply chain network by the item and by the level location;
retrieve a first entity on the sorted list;
determine whether any entities have been found;
automatically set R equal to R' and Q equal to Q' when at least one entity has been found;
determine whether the entity comprises a source;
automatically add a customer wait time of the source to the lead-time when the entity comprises a source;
automatically add a customer wait time variance to the lead-time variance when the entity comprises a source;
compute a new inventory performance comprising at least one of a fill rate, an expected back order, a customer wait time, a customer wait time variance, and an expected back order variance;
retrieve a second entity on the sorted list; and
automatically determine whether an additional entity is available and return to set R equal to R' and Q equal to Q' when the additional entity is available.

9. The system of claim 2, wherein the one or more computers are further configured to compute the reorder point derivative (Rd) and the ordering quantity derivative (Qd) for each of the two or more entities comprising:
retrieve the entity;
perform an R series, the R series comprising:
set the R equal to the R plus an Inc R and set the Q equal to the Q;
compute a system performance and cost;
compute a delta performance and cost for a change in the R; and
compute a derivative for the change in the R;
perform a Q series, the Q series comprising:
set the Q equal to the Q plus an Inc Q and set the R equal to the R;
compute a system performance and cost;
compute a delta performance and cost for a change in the Q; and
compute a derivative for the change in the Q; and
compute any remaining entity derivatives.

10. The system of claim 9, wherein compute a system performance and cost further comprises:
retrieve a current setting of the R and Q;
determine whether the entity has an entity source;
automatically add a entity source's computed customer wait time to the lead time and add the entity source's computed customer wait time variance to the lead time variance when the entity has an entity source;
compute inventory performance for at least one of a fill rate, an expected back order, a customer wait time, a customer wait time variance, and an expected back order variance;
compute an average inventory cost;
compute a delta performance and delta cost due to change in one of the R and the Q;
add the delta performance and delta cost to system performance and cost;
determine whether the entity has a destination;
automatically retrieve destinations from a highest level to a lowest level when the entity has a destination and return to retrieve current setting of entity the R and the Q; and
automatically return the system performance and cost when the entity does not have a destination.

11. A computer-implemented method, comprising:
receiving initial inputs over a computer network, the initial inputs comprising a target performance of a multi-echelon supply chain network and two or more entities comprising at least a first entity that produces an item and at least a final entity comprising a customer demand, each of the two or more entities comprising a reorder point (R) and an ordering quantity (Q);
computing a baseline inventory performance;
comparing the baseline inventory performance to the target performance;
computing a reorder point derivative and an ordering quantity derivative for each of the two or more entities;
sorting the one or more reorder point and ordering quantity derivatives;
selecting a best derivative (D') based on system performance or cost data;
constantly monitoring the D' to determine whether the D' is the reorder point derivative or the ordering quantity derivative;
automatically changing the reorder point (R) of the entity corresponding to the best derivative to the R plus a reorder point increment (Inc R) when the D' is the reorder point derivative;
automatically changing the ordering quantity (Q) of the entity corresponding to the best derivative to the Q plus an ordering quantity increment (Inc Q) when the D' is the ordering quantity derivative;
computing a new inventory level performance;
comparing the new inventory level performance to the target performance; and
adjusting, by at least one of the two or more entities, the ordering quantity (Q) at least partially based on the new inventory performance such that the size of the order is based on the adjusted ordering quantity (Q) of the item when the reorder point (R) is reached to reduce a customer wait time for the item based on the target performance associated with the final entity in the multi-echelon supply chain network.

12. The computer-implemented method of claim 11, wherein the initial inputs further comprise:
a reorder point increment and an ordering quantity increment (Q');
an average lead-time for each of the two or more entities in the multi-echelon supply chain network;
a lead-time variance for each of the two or more entities in the multi-echelon supply chain network;
a mean daily demand of each of the two or more entities in the multi-echelon supply chain network;
a demand variance of each of the two or more entities in the multi-echelon supply chain network;

a unit cost for each of the two or more entities in the multi-echelon supply chain network;

a holding cost for each of the two or more entities in the multi-echelon supply chain network; and an ordering cost for each of the two or more entities in the multi-echelon supply chain network.

13. The computer-implemented method of claim 12, wherein the target performance further comprises a fill rate.

14. The computer-implemented method of claim 13, further comprising:

automatically performing, by the computer, at least one optimization constraint iteration based on the at least one performance constraint for at least one of the two or more entities in the multi-echelon supply chain network such that the at least one entity is considered for the optimization constraint iteration when the at least one performance constraint is satisfied.

15. The computer-implemented method of claim 14, further comprising:

performing at least one cost reduction repair iteration by reducing at least one of either the R or the Q associated with at least one entity in the multi-echelon supply chain network; and automatically performing the cost reduction repair iterations by simultaneously determining a change in inventory performance for levels in the multi-echelon supply chain network when the R is decremented by the R' and when the Q is decremented by the Q'.

16. The computer-implemented method of claim 15, wherein the final entity further comprises one or more source entities, and the at least one cost reduction repair iteration automatically considers only the final entity and the one or more source entities of the final entity when the final entity has over-achieved the target performance and the at least one source entity is considered for the cost reduction repair iteration.

17. The computer-implemented method of claim 16, further comprising:

reporting an expected fill rate of the final entity;

reporting an expected customer wait time at the final entity;

reporting an average inventory as a function of the Q, safety stock, and expected back order;

reporting the safety stock;

reporting a stock level;

reporting the average inventory cost; and reporting a cycle stock.

18. The computer-implemented method of claim 12, wherein:

each entity further comprises an item and a level location; and compute the baseline inventory performance further comprises:

creating a sorted list by sorting each of the one or more of the entities in the multi-echelon supply chain network by item and by the item and by the level location;

retrieving a first entity on the sorted list;

determining whether any entity has been found;

automatically setting R equal to R' and Q equal to Q' when at least one entity has been found;

determining whether the entity comprises a source;

adding a customer wait time of the source to the lead-time if the entity comprises a source;

adding a customer wait time variance to the lead-time variance if the entity comprises a source;

computing a new inventory performance comprising at least one of a fill rate, an expected back order, a customer wait time, a customer wait time variance, and an expected back order variance;

retrieving a second entity on the sorted list;

determining whether an additional entity is available and returning to set R equal to R' and Q equal to Q' if additional entities are available; and completing the baseline performance if no additional entities have been found.

19. The computer-implemented method of claim 12, further computing the reorder point derivative (Rd) and the ordering quantity derivative (Qd) for each of the two or more entities comprising:

retrieving the entity;

performing an R series, the R series comprising:

setting the R equal to the R plus an Inc R and set the Q equal to the Q;

computing a system performance and cost;

computing a delta performance and cost for a change in the R; and computing a derivative for the change in the R;

performing a Q series, the Q series comprising:

setting the Q equal to the Q plus an Inc Q and set the R equal to the R;

computing a system performance and cost;

computing a delta performance and cost for a change in the Q; and computing a derivative for the change in the Q; and computing any remaining entity derivatives.

20. The computer-implemented method of claim 19, wherein computing a system performance and cost comprises:

retrieving a current setting of the entities R and Q;

determining whether the entity has an entity source;

automatically adding a entity source's computed customer wait time to the lead time and adding the entity source's computed customer wait time variance to the lead time variance when the entity has an entity source;

computing inventory performance for at least one of a fill rate, an expected back order, a customer wait time, a customer wait time variance, and an expected back order variance;

computing an average inventory cost;

computing a delta performance and delta cost due to change in one of the R and the Q;

adding the delta performance and delta cost to system performance and cost;

determining whether the entity has a destination;

retrieving destinations from a highest level to a lowest level if the entity has a destination and return to retrieve current setting of entities the R and the Q; and returning the system performance and cost if the entity does not have a destination.

* * * * *

UNITED STATES PATENT AND TRADEMARK OFFICE
CERTIFICATE OF CORRECTION

PATENT NO. : 9,779,381 B1
APPLICATION NO. : 13/327743
DATED : October 3, 2017
INVENTOR(S) : Chandrashekar Srikantiah Konanur Page 1 of 2

It is certified that error appears in the above-identified patent and that said Letters Patent is hereby corrected as shown below:

1. Please amend Column 5 Lines 60-61 as indicated below:

TABLE 1

| Symbol | Explanation |
|---|---|
| D | The random variable representing the demand |
| $\mu_D$ | Average demand |
| $\sigma_D^2$ | Variance of demand |
| L | The random variable representing the procurement lead time |
| $\mu_L$ | Expected Procurement lead time $\mu_L = E[L]$ |
| $\sigma_L^2$ | Variance of procurement lead time $\sigma_L^2 = Var[L]$ |
| PPV | The random variable representing the procurement problem variable |
| $\mu_{PPV}$ | Mean of the Procurement Problem Variable $\mu_{PPV} = E[PPV]$ |
| $\sigma_{PPV}^2$ | Variance of procurement problem variable $\sigma_{PPV}^2 = Var[PPV]$ |
| UC | Unit Cost |
| HC | Holding Cost |
| OC | Ordering Cost |

2. Please amend Column 6 Line 1 as indicated below:

The variance of PPV may be defined as $\sigma_{PPV}^2 = \mu_L \sigma_D^2 + \mu_D^2 \sigma_L^2$ 3. Please amend Column 6 Line 15 as indicated below:

TABLE 2

| Scenario | $P_x$ | L | $\sigma_L^2$ |
|---|---|---|---|
| 1 | 1 | $L_{i0}$ | $\sigma_{Li0}^2$ |

Signed and Sealed this
Twenty-fourth Day of July, 2018

Andrei Iancu
*Director of the United States Patent and Trademark Office*

4. Please amend the paragraph appearing at Column 7 Line 9 as indicated below:

In the above equations, $G_i^1(x)$ and $G_i^2(x)$ for the scenario "i" may be the first and second order loss functions, given an argument x. The logic to compute different loss functions may be based on the value of $\mu_{PPV}$ and $\sigma_{PPV}^2$ of the scenario.